Patented July 21, 1942

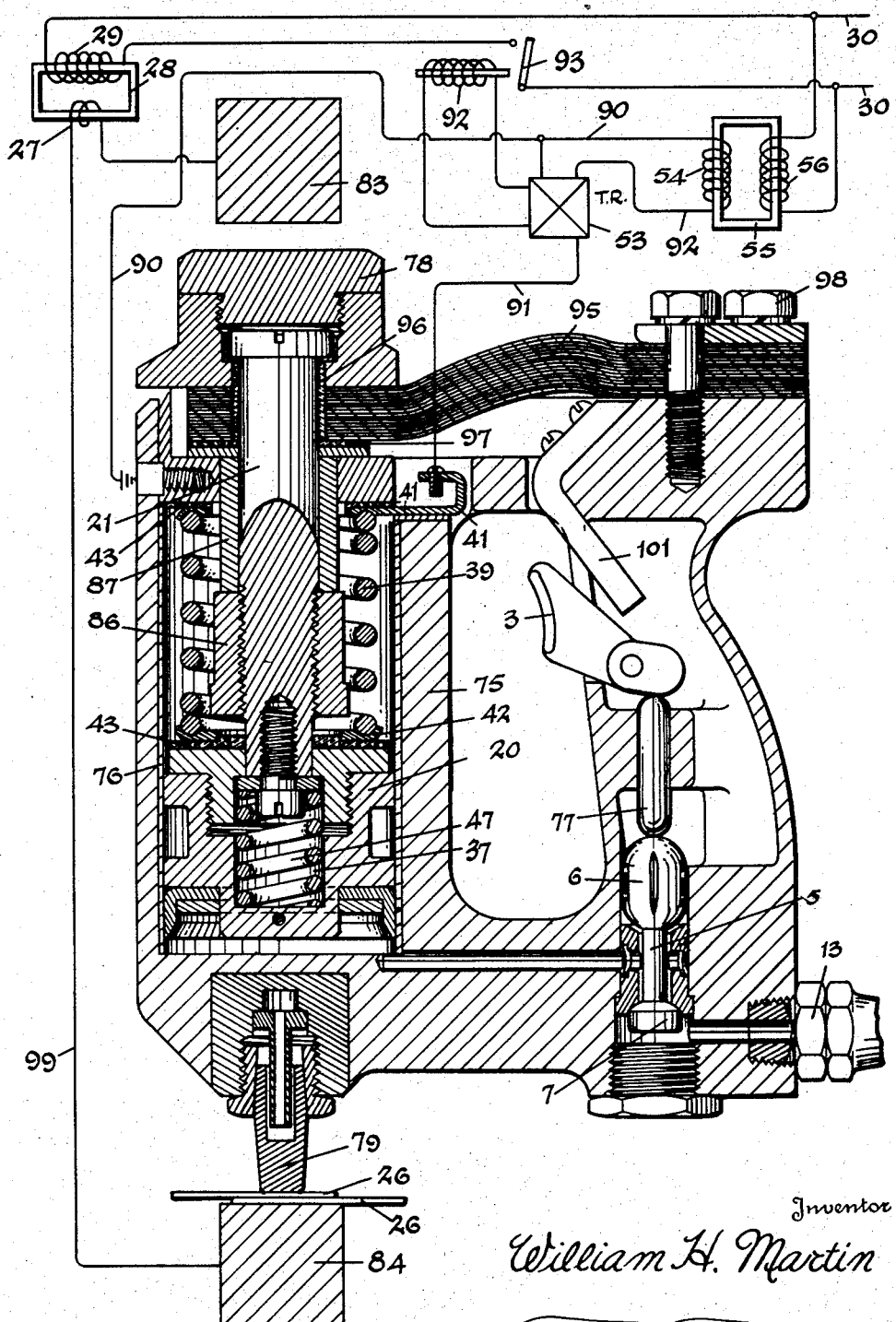

2,290,344

UNITED STATES PATENT OFFICE 2,290,344

FLUID PRESSURE RESISTANCE WELDER

William H. Martin, Detroit, Mich.

Application April 15, 1935, Serial No. 16,300

22 Claims. (Cl. 219—4)

My invention has for its object to provide an efficient welder for electrically welding two sheet metal parts together when subjected to a welding pressure, and wherein the electric welding current is automatically connected to the particular areas of the parts to be welded subsequent to the application of a welding pressure and disconnected therefrom in advance of the reduction of the pressure below the required welding pressure.

The invention particularly provides means automatically operated by the pressure of the welding point against the work for causing a welding current to flow in the circuit of the weld.

The invention also provides a means controlled directly by the welding current for preventing discontinuance of the flow of the welding current in advance of the discontinuance of the welding pressure.

The invention consists in other features and advantages which will appear from the following description and upon examination of the drawing. Structures containing the invention may partake of different forms and may be varied in their details and still embody the invention. To illustrate a practical application of the invention, I have selected a form of welder embodying the invention as an example of the various structures and the details of such structures that contain the invention and shall describe the selected structure hereinafter, it being understood that variations may be made and that certain features of my invention may be used to advantage without a corresponding use of other features of the invention and without departing from the spirit of the invention. The particular structure selected is shown in the accompanying drawing.

The figure illustrates one form of welder containing the invention and shows diagrammatically the electrical connection with the source of supply of electric current.

Referring to the structure illustrated in the figure, the welder 75 is provided with a body part or a frame 1 having a handle 2 and a trigger 3 for controlling the welds. The trigger 3 is pivotally supported in the handle 2 and operates a slidably supported pin 77 that engages a movable valve member 5 having two heads 6 and 7 connected together by means of the stem 8 that extends through valve seats formed for each of the heads and an air passageway that communicates with a cylinder 10 located in, or forming a part of, the frame 1. The end of the handle 2 is connected by a suitable connector 13 with a source of fluid pressure supply such as a source of air under pressure.

The heads 6 and 7 of the movable valve member 5 are small in size and are so formed as to produce a substantially balanced relation between the air pressure on the movable valve member 5 tending, however, by the pressure of the source of supply to maintain the valve closed and to enable opening of the valve by relatively slight pressure of the trigger.

The valve head 7, by the pressure of the air, operates to close the passageway 15 to the cylinder 10, and the valve head 6 opens an exhaust passageway from the cylinder 10 when the trigger 3 is released. The head 7 opens the connection through the passageway 15 to the cylinder 10, as the head 6 closes the exhaust passageway when the trigger depresses the valve heads. The head 6 has a plurality of grooves 16 terminating at a point above the valve seat provided for the head 6 which enables escapement of the air from the cylinder 10 when the trigger 3 is released. Release of the trigger enables the air pressure on the valve head 7 to raise the movable valve member 5 to cause the head 7 to seat and to cause the head 6 to unseat and permit the cylinder 10 to exhaust.

When the trigger 3 is operated to depress the movable valve member 5, the air under pressure enters the cylinder 10 and operates a piston 20 that is connected to a piston rod 21.

The piston 20 is provided with a suitable cup washer 36 to insure proper sealing of the fluid within the cylinder 10. The piston 20 is provided with a central bore 37, and the piston rod 21 is slidably supported in the frame 1 and has an end part that extends into the bore 37 of the piston 20. The movement of the piston 20 by the pressure of the fluid in the cylinder 10 is counteracted by means of a spring 39 located intermediate the piston 20 and the end of the cylinder 10. The spring 39 engages at one end with a sheet metal annular conductor 41 located at one end of the cylinder and with a sheet metal annular contact 42 carried by the piston 20. The conductors 41 and 42 are insulated, one from the cylinder and the other from the piston by suitable insulating sheets 43.

The spring 39 conducts the current between the conductor 41 and the contact 42. The construction eliminates more elaborate and expensive means for completing the current by the pressure of the movable piston and preventing short circuiting of the current between the parts that would otherwise be required for insulating the piston and the piston rod from the wall of the cylinder and prevent pitting and burning by the current. The circuit is completed from the frame through the piston rod 21 and a contact ring 46 located on the piston rod when the piston 20 has moved the piston rod 21 to cause engagement of the welding point 79 with the sheet metal parts 26 by a pressure well above the required welding pressure produced by the spring 39.

The movement of the piston 20 relative to the piston rod 21 is resisted by a spring 47 having a yielding resistance higher than that of the spring 39. The spring 47 resists completion of the circuit of the relay magnet 92 through the contact 42 located on the piston and the contact 86 located on the piston rod.

By the interposition of the spring 47 between the piston 20 and the piston rod 21 and interposition of the spring 39 between the piston and the frame 1, a welding point 79 of any desired length may be used and the parts 26 may have any thickness and yet the welding current will be allowed to flow only when the pressure between the parts has been raised to a point above the required welding pressure in advance of closure of the circuit, and the circuit will be opened by the spring 47 in advance of the release of the spring 39 when the air pressure on the piston is released.

The welding point gradually wears down or shortens in its usage, and often points of different lengths and different sizes are used for different kinds of work, and the different kinds of work have different thicknesses, and often the shape of the work requires welding points located on one side of the work different in length from the welding points on the other side of the work. Thus, the spring 47 controls the closing and opening of the circuit with reference to the pressure transmitted through the piston rod 21 regardless of the variation in the stroke of the piston rod 21.

Preferably the contact 86 is threaded on the piston rod and is suitably shouldered on a sleeve 87 and in position to receive the pressure of the contact 42. The spring yieldingly resists with increasing pressure the movement of the piston relative to the piston rod which produces a corresponding increased pressure on the welding point 79.

When a suitable time has elapsed to give opportunity for the welding current to complete the weld, the trigger 3 is released. The piston 20 is then moved, first by the pressure of the spring 47 which is greater than the pressure of the spring 39 and opens the circuit of the controlling relay. Further outward movement of the piston 20 is produced by the spring 39. Thus, the circuit of the welding current ceases in advance of the release of the pressure of the welding points on the work 26.

It has been found desirable in many instances to provide timed relays for controlling the period during which the current flows through the welding points in order to insure the formation of a desired weld. Where the welder shown in the drawing is used in conjunction with a timed relay, the flow of the welding current and release of the welding pressure may be controlled by the timed relay to produce release of the pressure upon, or at the expiration of a very short interval after the cessation of the flow of the welding current as determined by the timed relay, and the movement of the piston as determined by the pressure of the springs 39 and 47.

The form of welder illustrated in the figure may be used in conjunction with fixtures for the production of a plurality of welds along a defined straight or curved line. It may be used in conjunction with a plurality of other welders or may be used singly and moved from point to point manually, the electric connection when used singly or in conjunction with other welders being made through bus bars that conform to the line of the welds of the parts that are to be welded together, one bus bar being located in position to contact with the work, and the other bus bar in position to be connected by the movement of the piston and cylinder relative to each other upon production of the welding pressure on the work. If desired, the welder may be provided with means to produce cessation of the welding pressure immediately upon cessation of the flow of the welding current to insure a welding pressure during the flow of the welding current.

The period of flow of the welding current may be controlled by the operation of the valve 5 which causes the operation of the piston to close the circuit of a relay, such as the relay comprising the relay magnet 92 and the relay armature and contact 93. The relay magnet 92 may be connected to the contact 42 and a source of supply of electric current may be connected to the frame of the welder where it may be grounded. When the circuit of the relay is closed by the operation of the piston, it connects the source of current with the primary 29 of the transformer 28 to produce a welding current in the secondary 27 which is connected to the bus bars 83 and 84. Thus, the welding current may be directly controlled by the pressure in the cylinder 76 that operates the piston to close the contacts 42 and 86. If desired, the welding current may be controlled by a timer 53 that will in turn control the opening and closing of the relay contact 93 to insure the production of definite welding periods. Ordinarily, however, the welds may be produced with such rapidity that when the welding point strikes the work, the finger of the operator can scarcely release the valve quick enough to produce perfect welds. This is particularly true unless the metal is of considerable thickness and the points have a large contact area. It is, therefore, ordinarily preferable to maintain the direct control of the welding current through the operation of the valve.

Where the control of welding current is through not only the valve but also the timer, it is often very advantageous for the valve to be controlled by the welding current direct to prevent withdrawal of the point before the welding current ceases to flow, rather than to cause withdrawal of the welding point immediately upon opening the primary circuit to avoid arcing due to the diminishing flow in the secondary that is produced upon breaking the primary.

The welder 75 is provided with a contact head 78 secured to one end of the piston rod 21 and a welding point 79 connected to the cylinder or frame of the welder that form the electric terminals of the welder. The welder 75 is provided with a flexible laminated conductor 95. One end of the conductor 95 is clamped against the head 78, but is insulated from the end of the piston rod 21 by means of the insulating sleeve 96 and the washer 97 to prevent movement of the current along the piston rods and the cylinder. The other end of the laminated conductor 95 is connected to the frame of the welder 75 by means of the bolts 98. The source of welding current is connected to a pair of terminals or bus bars 83 and 84. Where bus bars are used, they may be formed to have a shape that conforms to the line of the welds to be produced on the work. Thus, the work may be located in electric contact with the bus bar 84 and when the pressure is exerted on the piston, the head 78 will abut the bus bar 83, and the welding point will be forced in the opposite direction against the work and thus produce the required welding pressure on the work.

If desired, the period of the flow of the welding current may be controlled by the timed relay 53. The timed relay 53 will then be controlled by the pressure exerted in the cylinder 76 on the piston 20 as determined by the resistance to the movement of the piston 20 which is exerted by the spring 47. The secondary 54 is connected to the frame of the welder, and the circuit to the timed relay 53 from the secondary 54 of the transformer 55 is through the spring 39, the contact 42, and the contact 86. When the trigger 3 is operated, the piston is moved relative to the piston rod to complete the circuit between the contacts 86 and 42, which closes the circuit of the relay. The timed relay directs the current from the secondary 54 through the relay magnet 92 and operates the armature 93 to complete the circuit of the main lines 30 through the primary 29 of the transformer 28.

The current from the secondary 27 then flows through the bus bar 83, through the head 78, the conductor 95, the frame of the welder 75 to the welding point 79, through the plates 26, to the bus bar 84 and returns by the line 99 to the secondary 27 of the transformer. The frame of the welder conducts the welding current to the welding point 79 and prevents its flow through the piston and cylinder. Pitting and burning of the contacting surfaces of the piston rod and the piston and the cylinder is thus eliminated.

The welder 75 is provided with a bar 101 that may be formed of magnetic metal. In the form of construction shown, the bar is bent at an angle and is so disposed that one end is located in proximity to the flexible laminated conductor 95 and the other end extends along and in proximity to one side edge of the trigger 3. The trigger 3 is also formed of magnetic material, and a part of the bar 101 is so disposed with reference to the trigger 3 that when the trigger 3 has been operated to connect the cylinder 76 with the source of air pressure supply, the said side edge of the trigger 3 contacts with the said part of the bar 101. As soon as the current is established through the laminated conductor 95 and the frame of the welder, the bar 101 is magnetized which magnetically holds the trigger 3 in its valve open position where it is retained until the current through the conductor 95 ceases to flow as controlled by the time relay 53. When the relay 53 releases the armature 93 to open the circuit of the main lines 30—30 through the transformer 28, the welding current ceases to flow through the work and also the trigger 3 is released, which, under the pressure of the air on the valve head 7, closes the connection with the source of air pressure supply, and the spring 47 permits separation of the connector sleeve 86 and the connector washer 42, and the spring 39 releases the pressure on the work. Thus, the pressure on the work is first raised to a welding pressure in advance of the flow of the welding current, and cessation of the flow of the welding current is caused in advance of the release of the welding pressure.

I claim:

1. An electric welder, a pressure means for exerting a pressure on the work, a source of supply of welding current, means for regulating the period of the flow of the welding current, and means operated by the pressure means and at a predetermined pressure of the pressure means on the work for operating the time regulating means to cause the welding current to flow through the work for the said predetermined period, and magnetic means inductively magnetized by the flow of the welding current for maintaining the pressure on the work until complete cessation of the flow of the welding current through the work.

2. In an electric welder, a piston and a cylinder, a welding point, a spring pressed by movement of the piston, the pressure of the spring sustained by the pressure of the welding point on the work to produce a welding pressure, a source of welding current, a time relay connected to the said source of current for controlling the period of flow of a welding current, a contact operated by the movement of the piston to complete the circuit through the time relay to cause the flow of a welding current through the work, an electro-magnetic control means operated by the flow of the welding current for controlling the period of the pressure, the electro-magnetic control means operating to discontinue the pressure on the work upon the discontinuance of the flow of the welding current.

3. In an electric welder, a source of supply of electric current and a source of supply of air under pressure, means for connecting one terminal of the source of supply of electric current to the work, a pneumatically operated pressure means comprising a cylinder, a piston, and a piston rod, the piston slidably supported on the piston rod, a welding point directly connected to the pressure means for exerting pressure on the work substantially the same as that exerted by the pressure means on the piston, the said welding point, and the cylinder and the piston located in axial alignment with respect to each other, a handle connected to the cylinder, a valve member located in the handle for controlling the flow of air under pressure to the cylinder, a lever member mounted in the handle for operating the said valve, a spring located intermediate one end of the cylinder and the piston, electric conductor members connected to opposite ends of the spring, one of the conductor members connected to the source of current, a second spring for resisting movement of the piston relative to the piston rod, a contact carried by the piston rod for making contact with one of the conductor members, means located in the circuit of the conductor members and contact for causing the flow of the current through the said welding point from the said source when the pressure of the piston on the second spring has reached a predetermined point.

4. In an electric welder, piston and cylinder parts, a welding point connected to one of the said parts, means for supporting the work, a source of electric current, a conductor insulatingly supported on one end of the piston and a conductor insulatingly supported within and on the end of the cylinder opposite to the said end of the piston on which the first named conductor is supported, a spring located within the cylinder, the ends of the spring engaging the said conductors for insulatingly connecting the source of electric current through the conductors, a contact located within the cylinder and adapted to be engaged by one of the said conductors to complete the circuit of the source through the said conductors and the spring, a second spring for resisting relative movements of the piston and cylinder and the closure of the contact when the welding point engages the work, and means located in the circuit of the contact for causing the flow of a welding current through the welding point and the work during the closure of the contact.

5. In an electric welder, piston and cylinder parts, a welding point connected to one of said parts, means for supporting the work, a source of electric current, a contact insulatingly supported on one end of the piston, a conductor insulatingly supported on the end of the cylinder opposite to the said end of the piston and connected to the said source of current, a flexible member interconnecting the said contact and the said conductor, a second contact, a spring for resisting movement of the piston and the closure of the contacts when the welding point engages the work, means located in the circuit of the contacts for causing the flow of a welding current through the welding point and the work.

6. In an electric welder, piston and cylinder parts, a piston rod, the piston and the piston rod having limited relative sliding movements, a spring located intermediate the piston and the piston rod for resisting the said relative movement, a welding point connected to one of said parts, means for supporting the work, a source of electric current, a contact carried by the piston and a contact carried by the piston rod, a conductor member connected to the contact carried by the piston and insulatingly supported in the cylinder and connected to the source of current, the contacts closed by the movement of the piston relative to the piston rod against the pressure of the spring when the welding point engages the work, means located in the circuit of the contacts for causing the flow of a welding current through the welding point and the work upon the production of a predetermined pressure of the welding point on the work.

7. In an electric welder, piston and cylinder parts, a piston rod, the piston and the piston rod having limited relative sliding movements, a spring located intermediate the piston and the piston rod for resisting the said relative movement, a welding point connected to one of said parts and operated by the said parts to press the welding point against the work and a source of electric current, a contact carried by the piston and a contact carried by the piston rod, a conductor insulatingly supported on one end of the cylinder and connected to the contact on the piston for insulatingly connecting the contact on the piston with the source of current, the contacts closed by the movement of the piston relative to the piston rod to cause the flow of the welding current upon the production of a predetermined pressure of the work and to open the contacts upon the production of a pressure less than the predetermined pressure.

8. In a pneumatically operated resistance welder, a work contacting conductor and a connector conductor connected to the source of the welding current, and located in spaced and opposed relation, a cylinder part and a piston part, a pair of welder terminals carried by the said parts and insertable between the conductors, a valve for controlling the pressure of air in the cylinder for pressing the terminals in opposite directions to press one terminal against one conductor and the work against the other conductor, a spring located in the cylinder and engaged by one of the said parts for resisting the movement of the said part by the pressure of one of the terminals for producing a like pressure on the other of the terminals, a pair of contacts located in the cylinder, one of the contacts carried by one of the said parts and operative to close a circuit of a source of supply of current through the other contact when the pressure of the terminals reaches a predetermined point, and means controlled by the circuit of the contacts for causing the flow of the welding current through the terminals and the work.

9. In a pneumatically operated resistance welder, a work contacting conductor and a connector conductor located in spaced and opposed relation and connected to the source of welding current, a cylinder and a piston, a pair of terminals carried by the cylinder and the piston and insertable between the said conductors, a valve for controlling the pressure of air in the cylinder for producing relative opposite movements of the terminals towards the conductors, one terminal for engaging the work and the other for engaging the connector, a piston rod, the piston slidably supported on the piston rod for limited movements, a spring for yieldingly resisting the movement of the piston relative to the piston rod, a contact carried by the piston and a contact carried by the piston rod, a flexible conductor insulatingly supported in the cylinder for connecting one of the contacts with a source of current, and means controlled by the circuit of the contacts for causing the flow of the welding current through the terminals and the work.

10. In a pneumatically operated resistance welder, a work contacting conductor and a connector conductor located in spaced and opposed relation and connected to the source of the welding current, cylinder and piston parts, a frame connected to the cylinder part, a pair of terminals carried by the cylinder and the piston for producing relative opposite movements of the terminals toward the conductors, one terminal for engaging the work and the other terminal for engaging the connector conductor, means for insulatingly supporting the said other terminal from the part to which it is connected, a flexible conductor member connected to the said insulated terminal and the frame, and means operated by the pressure in the cylinder for causing a welding current to flow through the terminals and the work when the terminals engage the connector and the work.

11. In a pneumatically operated resistance welder, a work contacting conductor and a connector conductor located in spaced and opposed relation, and connected to the source of the welding current, cylinder and piston parts, terminals connected to the cylinder and the piston parts, the cylinder and piston parts operative to produce relative opposite movements of the terminals towards the conductors, a frame, one terminal supported on the frame for engaging the work and the other for engaging the connector conductor, means for insulatingly supporting the said other terminal, a flexible conductor member connected to the said insulated terminal and the frame and a pair of contacts located within the cylinder, a spring for resisting movement of one of the contacts relative to the other and the piston relative to the cylinder, means for closing the contacts by movement of the piston relative to the cylinder, and means controlled by the circuit of the contacts for causing the flow of the welding current through the terminals, the frame, and the work.

12. In a pneumatically operated resistance welder, a work contacting conductor and a connector conductor connected to a source of welder current and located in spaced and opposed relation, a cylinder, a piston, and a piston rod, a pair of welder terminals connected to the cylinder and the piston rod and located in axial alignment with the cylinder and the piston rod and insertable between the conductors, a valve for controlling the pressure of air in the cylinder for producing relative opposite movements of the terminals toward the conductors, one terminal for engaging the work and the other for engaging the connector, the piston slidably supported for limited movements on the piston rod, a pair of contacts located within the cylinder, one located on the piston and the other located on the piston rod, a spring located intermediate the piston and the piston rod for resisting movement of the piston relative to the piston rod when one of the welder terminals engages the work, the contact located on the piston insulatingly supported, a spring insulatingly supported on one end of the cylinder and in contact with the contact on the piston, means for connecting the said contacts to a source of current, means controlled by the circuit of the said contacts for producing a welding current through the conductors, the terminals, and the frame of the welder.

13. In a pneumatically operated resistance welder, a work contacting conductor and a connector conductor connected to the source of the welding current and located in spaced relation, a cylinder part, a piston part, and a frame, a pair of welder terminals carried by the cylinder and the piston and insertable between the conductors, a valve for controlling the pressure of the air in the cylinder for producing relative opposite movements of the terminals towards the conductors, one terminal for engaging the work and the other terminal for engaging the connector, the said other terminal insulatingly supported on one of said parts, a flexible conductor connected to the said insulated terminal and to the frame, a magnetic member located on the frame and in proximity to the flexible conductor and magnetized by the flow of the welding current through the flexible connector member for preventing operation of the valve to reduce the pressure in the cylinder until the welding current ceases to flow, means for producing the flow of the welding current through the terminals and the work, and means for discontinuing the flow of the welding current.

14. In an electric welder, a pneumatically operated pressure means comprising a cylinder and a piston, a valve for controlling the flow of air under pressure to the cylinder and having a magnetic part, a magnetizable member for electromagnetically engaging the magnetic part when the valve is open and the member is magnetized, a means for directing the welding current through the welder in proximity to the magnetizable member for magnetizing the member when the valve is open and operative to maintain the connection of the cylinder with the source of air pressure supply and the welding point at a welding pressure during the flow of the welding current, and means for discontinuing the flow of the welding current and effecting release of the magnetic part by the magnetizable member.

15. In an electric welder, a welding point, a pneumatically operated pressure means for pressing the welding point against the work, a magnetizable member for controlling the pressure means, a means for directing the welding current through the welder in proximity to the magnetizable member for magnetizing the said member by the welding current, the magnetizable member operative to maintain the pressure of the welding point on the work during the flow of the welding current, and means for discontinuing the flow of the welding current and effecting release of the welding point from the work.

16. In an electric welder, a source of supply of electric current and a source of supply of air under pressure, means for connecting one terminal of the source of supply of electric current to the work, a pneumatically operated pressure means comprising a cylinder, a piston, and a piston rod, the piston slidably connected to the piston rod, a welding point connected to the cylinder, means for controlling the flow of air under pressure to the cylinder, an electric conductor member secured to one side of the piston and located in the cylinder, a contact secured to the piston rod and contiguous to the conductor member and located in the cylinder, a spring having one end engaging the piston and the other end engaging the piston rod and located within the cylinder for resisting the movement of the piston relative to the piston rod, means located in the circuit of the conductor member and the contact for causing the flow of a welding current through the said welding point when the pressure of the said spring has reached a predetermined point in the pressure of the pressure means.

17. In an electric welder, a cylinder, a piston movable in the cylinder, and a piston rod, a welding point operated by the cylinder and the piston to press the welding point against the work, the piston slidably connected to the piston rod, a contact carried by the piston and a contact carried by the piston rod, a spring for resisting movements of the piston relative to the piston rod, a second spring located intermediate the piston and one end of the cylinder and engaged thereby to conduct the current to the contacts and cause a return of the piston rod and piston when the pressure in the cylinder is released to a predetermined point, means located in the circuit of the contacts for causing the flow of a welding current through the welding point and the work when the pressure of the welding point on the work reaches a predetermined point.

18. In an electric welder, a source of supply of electric current and a source of supply of air under pressure, a cylinder, a piston movable in the cylinder, means for connecting the cylinder to the source of supply of air under pressure, a welding point, a piston rod, one end of the piston rod connected to the welding point and the other end of the piston rod slidably connected to the piston, a spring located in the cylinder and movable with the piston and the piston rod for resisting the movement of the piston relative to the piston rod and producing a pressure between the welding point and the work, an electric conductor member located in the cylinder and supported on the piston and connected to the source of current, a contact located on the piston rod and within the cylinder for making contact with the conductor member when the piston has moved against the spring to a predetermined pressure point, means located in the circuit of the conductor member and the contact for causing the flow of a welding current through the welding point and the work.

19. In an electric welder, a source of supply of electric current and a source of supply of air under pressure, a pair of electric conductors connected to said source, a cylinder, a piston movable in the cylinder, means for connecting the cylinder to the source of supply of air under pressure, a piston rod, one end of the piston rod slidably connected to the piston, the welder having a pair of electric terminals, one terminal supported on the cylinder, the other on the piston rod, one of the terminals for contacting one of the conductors and the other of the terminals for pressing the work against the other conductor, the said terminals, cylinder and piston rod located in substantially axial alignment, a spring located in the cylinder part for resisting movement of the piston relative to the piston rod, a pair of coacting contacts, one located on the piston and the other on the piston rod, means connected in the circuit of the said pair of contacts for causing the flow of the welding current when the pressure of the cylinder reaches a predetermined point.

20. Apparatus for controlling the movements of an electrode for applying current to a work-piece, comprising: magnetizable means having a normal position and movable from said normal position to a predetermined position for effecting movement of said electrode relative to said work-piece; and electro-responsive means, energized after said magnetizable means is moved from its normal position toward its said predetermined position, for maintaining said magnetizable means in its said predetermined position.

21. Apparatus for controlling the movements of an electrode for applying current to a work-piece, comprising: magnetizable means having a normal position and movable from said normal position to a predetermined position for effecting movement of said electrode relative to said work piece; electro-responsive means, energized after said magnetizable means is moved from its normal position toward its said predetermined position, for maintaining said magnetizable means in its said predetermined position while current flows in said electrode.

22. Apparatus for controlling the movements of an electrode for applying current to a work-piece, comprising: valve means having a normal position and movable from said normal position to a predetermined position for effecting movement of said electrode relative to said work-piece; and electro-responsive means, energized after said valve means is moved from its normal position toward its said predetermined position, for maintaining said valve means in its said predetermined position.

WILLIAM H. MARTIN.